(12) United States Patent
Murphy

(10) Patent No.: US 11,173,938 B1
(45) Date of Patent: Nov. 16, 2021

(54) SHOPPING CART EXTENDER

(71) Applicant: Ronald Murphy, Medford, NJ (US)

(72) Inventor: Ronald Murphy, Medford, NJ (US)

( * ) Notice: Subject to any disclaimer, the term of this patent is extended or adjusted under 35 U.S.C. 154(b) by 0 days.

(21) Appl. No.: 16/910,411

(22) Filed: Jun. 24, 2020

(51) Int. Cl.
*B62B 3/14* (2006.01)

(52) U.S. Cl.
CPC ................... *B62B 3/1476* (2013.01)

(58) Field of Classification Search
CPC ... B62B 3/1476; B62B 3/1468; B62B 3/1408; B62B 3/1412
See application file for complete search history.

(56) References Cited

U.S. PATENT DOCUMENTS

| | | | |
|---|---|---|---|
| 3,774,929 A | 11/1973 | Stanley | |
| 4,156,318 A | 5/1979 | Economy | |
| 4,643,280 A * | 2/1987 | Hensley | A45C 3/02 108/44 |
| 4,679,818 A * | 7/1987 | Kakavas | A47F 3/14 108/90 |
| 4,852,498 A * | 8/1989 | Judd | A47B 23/043 108/43 |
| 5,004,252 A | 4/1991 | Kraper | |
| 5,265,893 A | 11/1993 | Ettlin | |
| 5,566,609 A * | 10/1996 | Kirschner | B62B 3/1428 108/42 |
| 6,354,612 B1 | 3/2002 | Adamson | |
| 9,180,899 B2 | 11/2015 | Eun et al. | |
| 9,974,384 B1 * | 5/2018 | King | A47F 13/00 |
| 2004/0080129 A1 * | 4/2004 | Myers | B62B 3/1428 280/33.992 |
| 2004/0216339 A1 * | 11/2004 | Garberg | B62B 3/1408 40/308 |
| 2005/0212234 A1 | 9/2005 | McFarland | |
| 2007/0273113 A1 * | 11/2007 | Muir | B62B 3/1468 280/33.992 |
| 2010/0194064 A1 * | 8/2010 | Simonson | B62B 3/1464 280/47.35 |
| 2014/0251866 A1 * | 9/2014 | Smallman | B65D 1/34 206/557 |
| 2016/0113388 A1 * | 4/2016 | Distefano | A45C 13/28 108/41 |
| 2016/0353882 A1 * | 12/2016 | Jose | A45C 13/28 |

* cited by examiner

*Primary Examiner* — Brian L Swenson
(74) *Attorney, Agent, or Firm* — Thomas J. Germinario

(57) ABSTRACT

An expandable rectangular platform, comprises a central panel to which two side panels are pivotally attached on either side by at least one pair of panel hinges. The platform can be expanded, with the side panels extended, so as to extend over the sides of the cart basket, in which extended configuration it can serve a load-bearing function. When the platform is not in use, the side panels are pivoted under the central panel, and their lengthwise sides are secured together by one or more panel connectors.

4 Claims, 4 Drawing Sheets

SHOPPING CART EXTENDER

FIELD OF INVENTION

The present invention relates to the general field of shopping cart accessories, and more particularly to accessories for expanding the carrying capacity of shopping carts.

BACKGROUND OF THE INVENTION

Shopping carts are in wide use at virtually all consumer retail stores, such as grocery, liquor and home improvement stores. Such shopping carts typically have an upper basket, in which fragile and delicate items are often placed. Placing heavy and bulky items, such as large bags of pet food or water softener, on top of smaller items in the cart basket often poses a problem for shoppers. Therefore, it's advantageous to provide a foldable platform, which can be extended to cover the top of the cart basket so as to support heavy and bulky items, and which can be folded up so as to fit within the cart basket when not in use.

SUMMARY OF THE INVENTION

As shown in FIG. 1, the present invention is an expandable rectangular platform, comprising a central panel to which two side panels are pivotally attached on either side by at least one pair of panel hinges. The platform can be expanded, with the side panels extended, so as to extend over the sides of the cart basket, as depicted in FIG. 1, in which extended configuration it can serve its load-bearing function. When the platform is not in use, the side panels are pivoted under the central panel, as shown in FIG. 4, and their lengthwise outer sides are secured together by one or more panel connectors, which can be conventional hook-and-loop fasteners or conjugate male-female mechanical fasteners, such as hook-and-post, latches, clasps, snaps or catches.

The central panel is dimensioned to fit inside the cart basket when not in use. The side panels conform in length to the central panel but have half its width, so that when the side panels are folded under the central panel, the rectangular dimensions are those of the central panel alone, thus allowing the entire folded platform to be stowed inside the cart basket.

As best seen in FIG. 5, the two widthwise outer sides of the side panels form longitudinal channels, which slidably enclose a stud extending from and supporting a spring-loaded clamp (best seen in FIG. 7), by which the platform can be secured to the top of the cart basket.

Preferably, the panel hinges connecting the side panels to the central panel are spring-loaded and lockable, as illustrated in FIGS. 6A and 6B, so that the hinge springs are under tension when the platform is folded up, and when released the hinge springs extend the side panels, as shown in FIGS. 2 and 3.

The panels of the platform are preferably made of a rigid, light-weight material, such as a plastic-covered wire mesh. The panels are capable of bearing weights up to 50 pounds without significant bending or deflection.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENT

Figure 1:
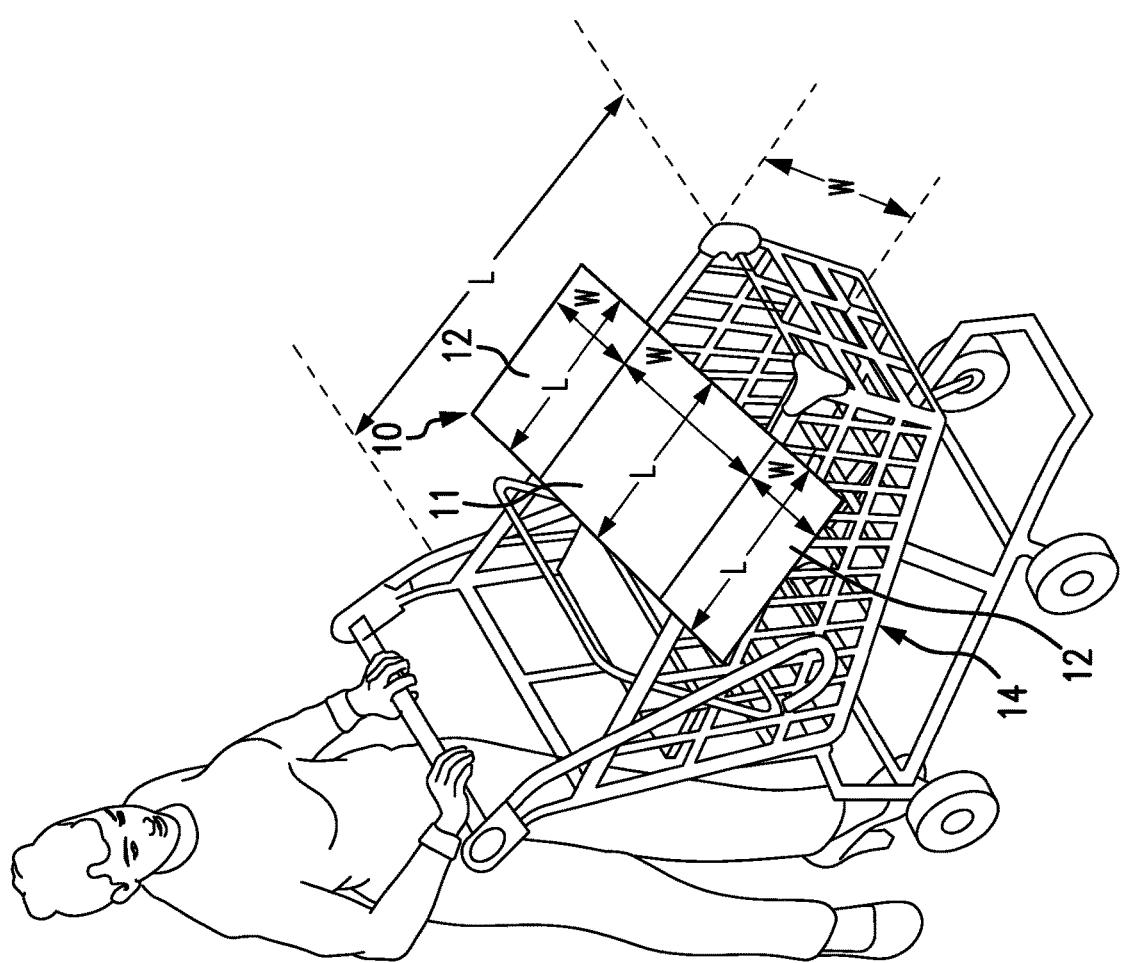
FIG. 1 is a perspective view of one exemplary embodiment of the present invention in its extended configuration connected to the top of a shopping cart basket.
Figure 2:
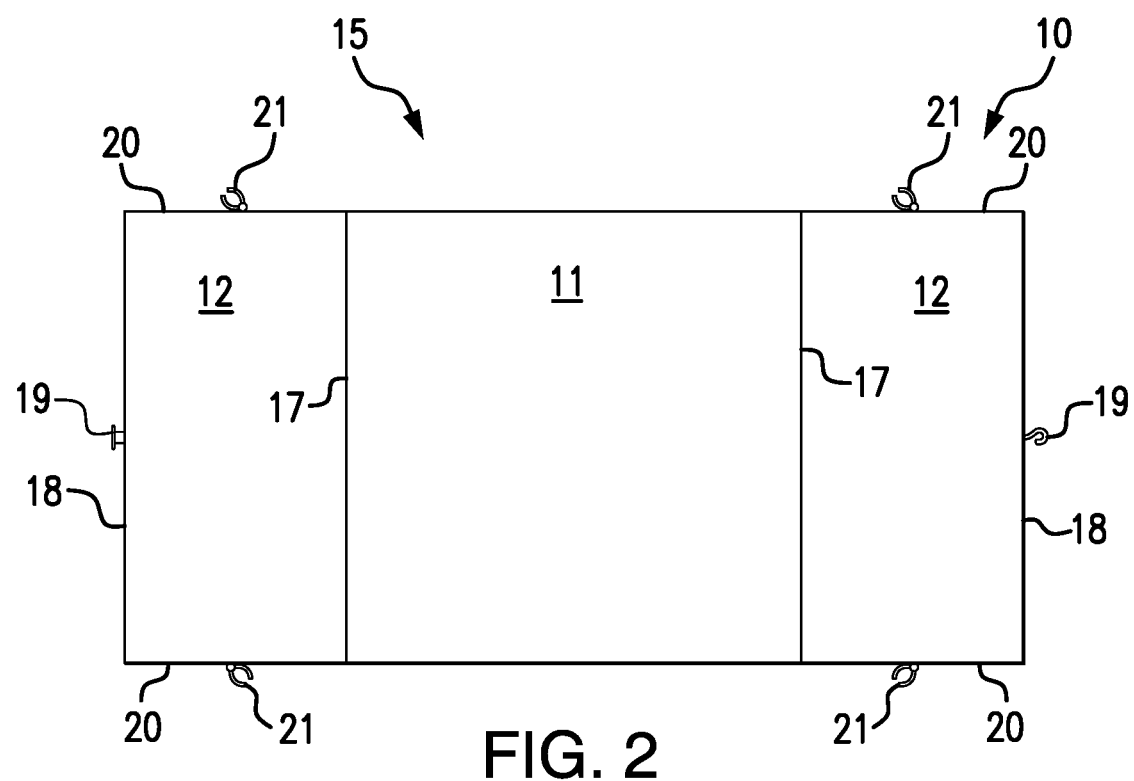
FIG. 2 is an obverse side plan view of the embodiment of the present invention in its extended configuration.
Figure 3:
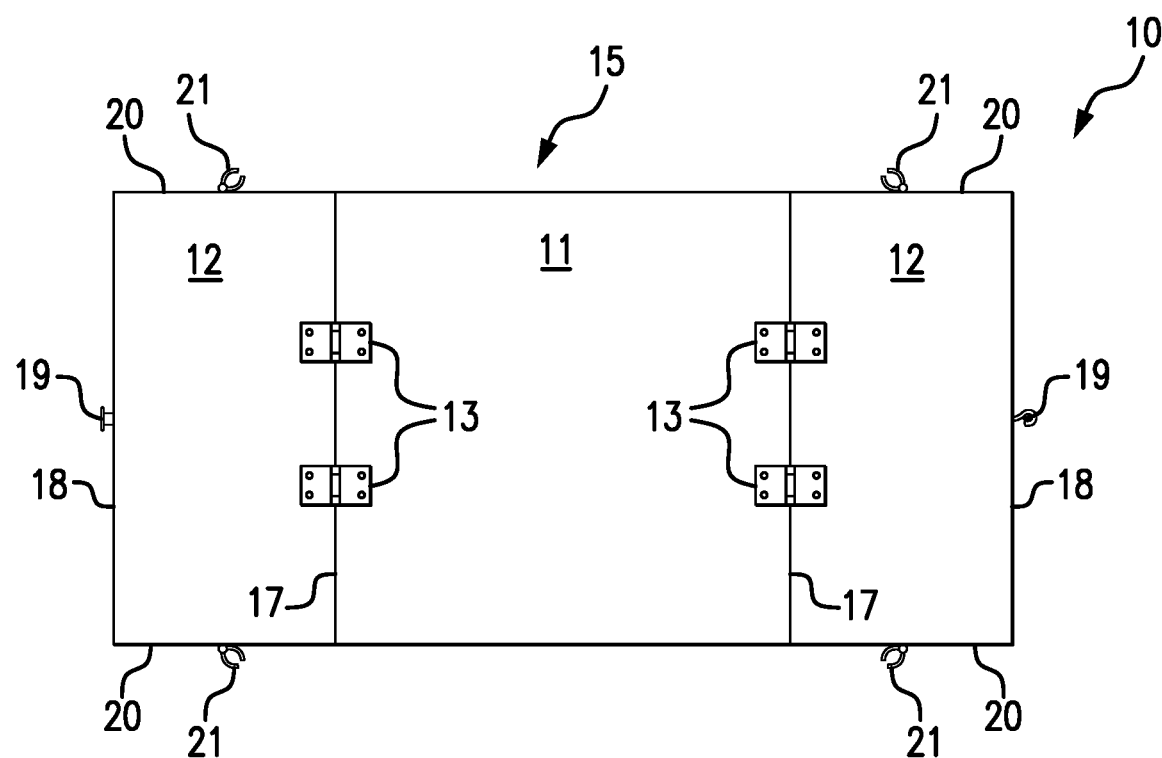
FIG. 3 is a reverse side plan view of the embodiment of the present invention in its extended configuration.

Referring to FIGS. 1-3, the exemplary embodiment of the present invention is an expandable platform 10 comprising a rectangular central panel 11 and two rectangular side panels 12, pivotally attached to either side of the central panel 11 by two pairs of panel hinges 13. When the expandable platform 10 is in use, the side panels 12 extend outward from either side of the central panel 11 in the extended configuration 15 depicted in FIGS. 1-3. In the extended configuration 15, the expandable platform 10 is securable to the top of a shopping cart basket 14, as seen in FIG. 1, with the side panels 12 extending over the sides of the basket 14. For purposes of orientation, the dimensions of the central and side panels 11 12 and the cart basket 14 referred to as "length" and "width," herein and in the claims, are labelled as "L" and "W" respectively, in FIG. 1. The central panel 11 has a width less than the width of the cart basket 14, and the central panel 11 has a length less than the length of the basket 14. The two side panels 12 each have a length equal to the length of the central panel 11, and they each have a width equal to half the width of the central panel 11.

Figure 4:
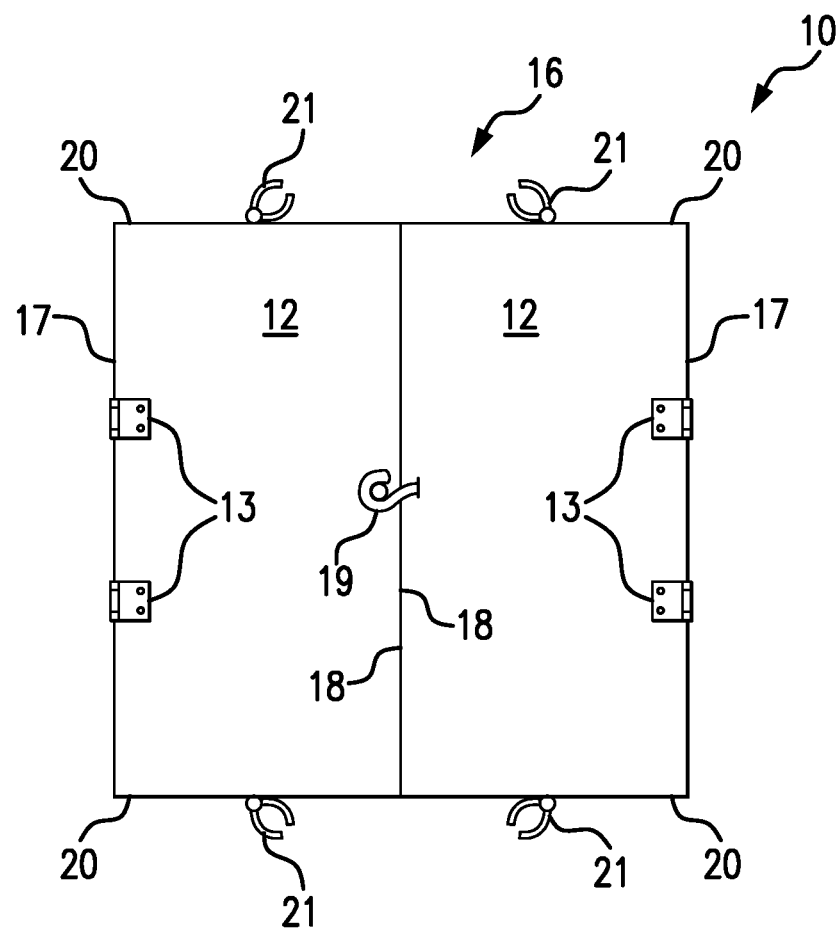
FIG. 4 is a reverse side plan view of the embodiment of the present invention in its folded configuration.

The two side panels 12 each have a length-wise inner side 17, along which it is hingeably attached to the central panel 11, and they each have a length-wise outer side 18, on which they each have a panel connector 19. The side panels 12 are folded under the central panel 11 when the expandable platform 10 is not in use, so as to put the platform 10 in the folded configuration 16, as depicted in FIG. 4. In the folded configuration 16, the lengthwise outer sides 18 of the side panels 12 engage one another and are secured together by the panel connector 19, which is here illustrated as a hook-and-post type fastener. When in the folded configuration 16, the platform 10 can be readily stowed within the cart basket 14.

Figure 5:
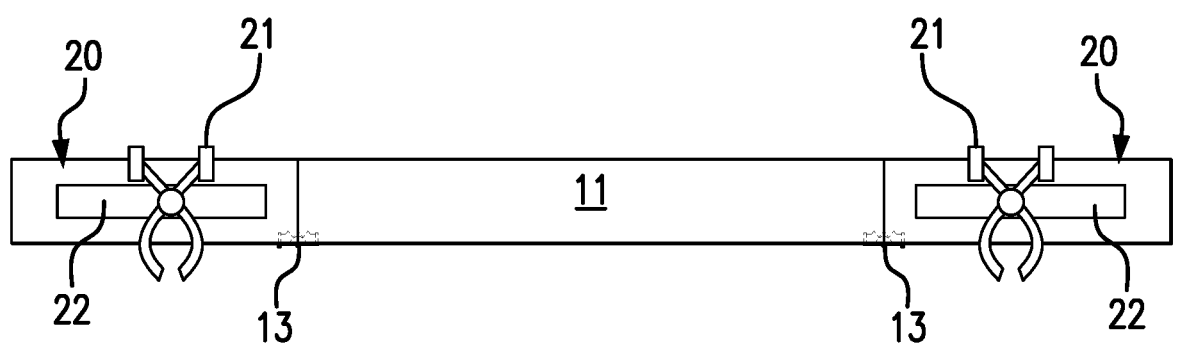
FIG. 5 is a side profile view of the embodiment of the present invention in its extended configuration.
Figure 7:
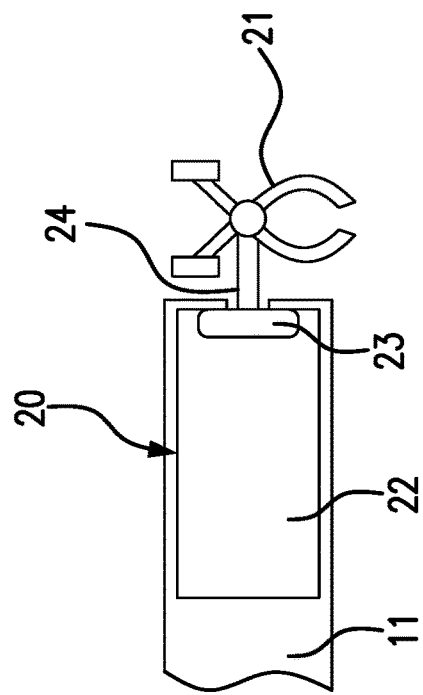
FIG. 7 is a side profile view of an exemplary spring-loaded clamp with its stud slidably enclosed within the longitudinal channel of one of the side panels.

Each of the side panels 12 has two widthwise outer sides 20, each of which forms a longitudinal channel 22, as seen in FIG. 5. The longitudinal channel 22 encloses a clamp stud 23, shown in FIG. 7, which is slidable along the length of the channel 22, and which is connected by a stem 24 to a spring-loaded clamp 21. The clamps 21 provides the means by which the platform 10, in its extended configuration 15, is secured to the top of the cart basket 14. The position of the clamps 21 along the widthwise outer sides 20 of the side panels 12 is slidably adjustable, thereby allowing the clamps 21 to be aligned with various widths of different shopping carts.

Figure 6A:
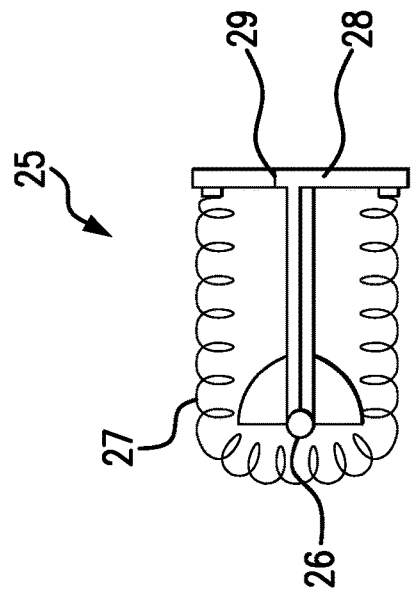
FIGS. 6A and 6B are side profile view of an exemplary panel hinge in the extended and folded configurations, respectively.
Figure 6B:
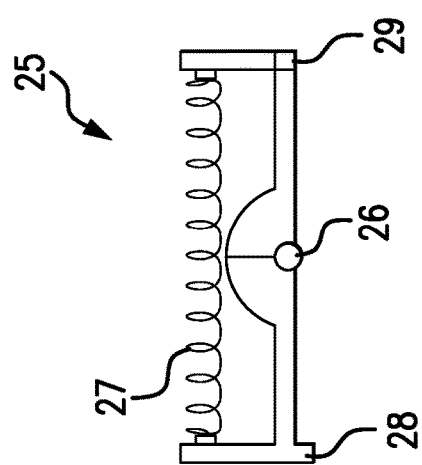

As depicted in FIGS. 6A and 6B, the panel hinges 13 are preferably spring-loaded hinges 25, comprising a hinge pivot 26 and a hinge spring 27. FIG. 6A shows the hinge 25 in an open position, corresponding to the extended configuration 15 of the platform 10, while FIG. 6B shows it in a closed position, corresponding to the folded configuration 16 of the platform 10. The hinge 25 has a locking tab 28 which conjugately mates with a tab socket 29 to retain the hinge 25 in the closed position.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. An expandable platform for carrying items on a top of a basket of a shopping cart, comprising:
   - a rectangular central panel, having a top surface and a bottom surface, and having a width less than a width of the basket, and having a length less than a length of the basket;
   - two generally rectangular side panels, wherein each side panel has a length equal to the length of the central panel, and wherein each side panel has a width equal to one-half the width of the central panel, and wherein the side panels and the central panel have a combined width that is greater than the width of the basket;
   - wherein the side panels are lengthwise pivotally attached by at least one pair of panel hinges to opposite sides of the main panel, so as to form the expandable platform;
   - wherein each of the side panels has a lengthwise outer side, which is opposite to a lengthwise inner side by which the side panel is hingeably attached to the main panel;
   - wherein the side panels are pivotally foldable against the bottom surface of the main panel, so that the lengthwise outer sides of the side panels engage one another and are securable together by one or more panel connectors, and so as to put the expandable platform in a folded configuration, in which the expandable platform is storable within the basket of the shopping cart;
   - wherein the side panels are pivotally extendable so to be co-planar with the central panel and so as to put the expandable platform in an extended configuration; and
   - wherein each of the side panels has two widthwise outer sides, which are perpendicular to the lengthwise outer side, and wherein each of the widthwise outer sides forms a longitudinal channel, and wherein each longitudinal channel slidably encloses at least one clamp stud, and wherein each of the clamp studs has a stem by which the clamp stud supports a spring-loaded clamp, by which the expandable platform is securable to the top of the basket of the shopping cart, and wherein a position of each of the spring-loaded clamps along the widthwise outer side of the side panel is adjustable to conform to the width of the basket of the shopping cart.

2. The expandable platform according to claim 1, wherein the pairs of panel hinges comprise locking, spring-loaded hinges.

3. The expandable platform according to claim 1, wherein the panel connectors are conjugate male-female mechanical fasteners, latches, clasps, snaps or catches, or are hook-and-loop fasteners.

4. The expandable platform according to claim 2, wherein the panel connectors are conjugate male-female mechanical fasteners, latches, clasps, snaps or catches, or are hook-and-loop fasteners.

* * * * *